United States Patent Office 3,309,339
Patented Mar. 14, 1967

3,309,339
NEW TRISPHENOLS AND EPOXIDE RESINS PREPARED THEREFROM
Alfred O. Barton, Florham Park, William D. Griffin, Morris Township, Morris County, Richard B. Lund, Whippany, Zalik Oser, Morristown, and John Vitrone, Troy Hills, N.J., assignors to Allied Chemical Corporation, New York, N.Y., a corporation of New York
No Drawing. Filed Nov. 12, 1963, Ser. No. 323,067
20 Claims. (Cl. 260—47)

This invention relates to new trisphenols and epoxide resins derived therefrom and, more particularly, to new $\alpha,\alpha',\alpha''$-tris(hydroxyphenyl)-1,3,5-trialkylbenzenes, their corresponding epoxide resins and processes for their preparation.

Trisphenols have long been recognized, in addition to their inherent antiseptic properties, as useful intermediates in the preparation of more complex organic structures. For example, resins are readily prepared by reacting triphenols with formaldehyde, acid anhydrides and, more importantly, with epichlorohydrin to produce epoxide resins. It has been found, and surprisingly so, that epoxide resins prepared from $\alpha,\alpha',\alpha''$-tris(hydroxyphenyl)-1,3,5-trialkylbenzenes exhibit low shrinkage, extraordinary hardness, ability to wet and to adhere to a variety of materials, chemical inertness and outstanding mechanical strength.

Accordingly, it is an object of the present invention to provide new $\alpha,\alpha',\alpha''$-tris(hydroxyphenyl)-1,3,5-trialkylbenzenes.

It is a further object of the present invention to provide new $\alpha,\alpha',\alpha''$-tris(hydroxyphenyl)-1,3,5-trialkylbenzene epoxide resins.

A further object is to provide a process for preparing $\alpha,\alpha',\alpha''$-tris(hydroxyphenyl)-1,3,5-trialkylbenzenes in high yield.

Still a further object is to provide a process for preparing $\alpha,\alpha',\alpha''$-tris(hydroxyphenyl)-1,3,5-trialkylbenzene epoxide resins in high yield. Other objects and advantages will be apparent from the following description.

The $\alpha,\alpha',\alpha''$-tris(hydroxyphenyl)-1,3,5,-trialkylbenzenes of the present invention may be represented by the following formula:

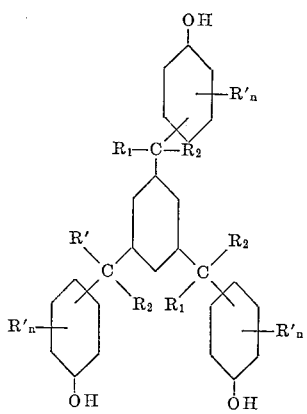

wherein $R_1$ and $R_2$ are the same or different and are selected from the group consisting of hydrogen and alkyl radicals having 1 to 2 carbon atoms, R' is selected from the group consisting of chlorine and alkyl radicals having 1 to 5 carbon atoms and $n$ is an integer from 0 to 2.

$\alpha,\alpha',\alpha''$-Tris(hydroxyphenyl)-1,3,5-trialkylbenzenes may be prepared by admixing a 1,3,5-trisubstituted benzene compound selected from the group consisting of 1,3,5-trialkenylbenzenes represented by the formula:

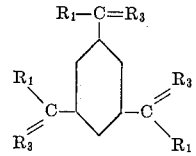

wherein $R_1$ is selected from the group consisting of hydrogen and alkyl radicals having 1 to 2 carbon atoms and $R_3$ is selected from the group consisting of $CH_2$ and $CH$—$CH_3$ radicals and $\alpha,\alpha',\alpha''$-trihydroxy-1,3,5-trialkylbenzenes represented by the formula:

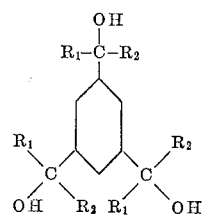

wherein $R_1$ and $R_2$ are the same or different and are selected from the group consisting of hydrogen and alkyl radicals having 1 to 2 carbon atoms, with a phenolic compound of the formula:

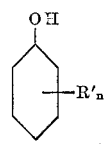

wherein R' is an alkyl radical having 1 to 5 carbon atoms and $n$ is an integer from 0 to 2, in a mol ratio of at least about 3 mols phenolic compound per mol of 1,3,5-trisubstituted benzene compound, at temperature of from the melting point to the boiling point of the reaction mixture, in the presence of an acidic condensation catalyst, and thereafter recovering the resulting $\alpha,\alpha',\alpha''$-tris(hydroxyphenyl)-1,3,5-trialkylbenzene from the reaction mixture.

Suitable trialkenylbenzene reactants are illustrated by the following compounds:

1,3,5-trivinylbenzene
1,3,5-tris(isopropenyl)benzene
1,3,5-tris(2-sec.butenyl)benzene Examples of suitable tris($\alpha$-hydroxyalkyl)benzenes are:

$\alpha,\alpha',\alpha''$-trihydroxy-1,3,5-triethylbenzene
$\alpha,\alpha',\alpha''$-trihydroxy-1,3,5-triisopropylbenzene
$\alpha,\alpha',\alpha''$-trihydroxy-1,3,5-tri-sec.-butylbenzene
$\alpha,\alpha',\alpha''$-trihydroxy-1-methyl-3,5-diethylbenzene
$\alpha,\alpha',\alpha''$-trihydroxy-1-methyl-3-ethyl-5-isopropylbenzene
$\alpha,\alpha',\alpha''$-trihydroxy-1-ethyl-3,5-diisopropylbenzene Illustrative phenolic reactants are:

phenol
o-cresol
m-cresol
p-cresol
2,6-dimethylphenol
3-ethylphenol
4-ethylphenol
2-pentylphenol
2,4-diethylphenol
2,3-diethylphenol
2-methyl-6-isopropylphenol
2-ethyl-6-methylphenol
2-isopropyl-4-methylphenol 2-isopropyl-3-ethylphenol
2,5-diisopropylphenol
2-isopropyl-3-tert.-butylphenol
2-sec.-butyl-4-methylphenol
2-sec.-butyl-6-ethylphenol
2-tert-butyl-4-methylphenol
2-tert-butyl-6-ethylphenol
2-tert-butyl-3-n-butylphenol and the like.

The reaction employing a trialkenylbenzene reactant with a phenolic reactant may be illustrated by the equation:

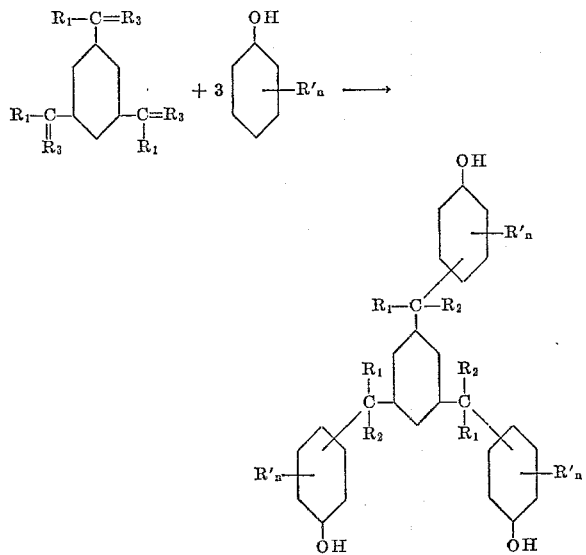

wherein $R_1$ is selected from the group consisting of hydrogen and alkyl radicals having from 1 to 2 carbon atoms, $R_2$ is an alkyl radical having 1 to 2 carbon atoms, $R'$ is an alkyl radical having 1 to 5 carbon atoms, $n$ is an integer from 0 to 2 and $R_3$ is selected from the group consisting of $CH_2$ and $CH-CH_3$ radicals.

The reaction employing a tris($\alpha$-hydroxyalkyl)benzene reactant with a phenolic reactant may be illustrated by the equation:

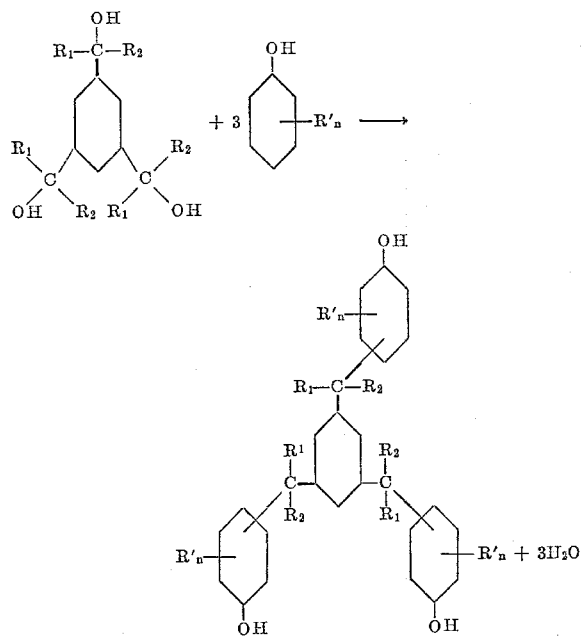

wherein $R_1$ and $R_2$ are the same or different and are selected from the group consisting of hydrogen and alkyl radicals having from 1 to 2 carbon atoms, $R'$ is an alkyl radical having 1 to 5 carbon atoms and $n$ is an integer from 0 to 2.

The reaction product of the above-illustrated phenolic compounds with the trialkenylbenzene or tris ($\alpha$-hydroxyalkyl)benzene compounds is comprised of symmetrical and non-symmetrical isomeric forms of $\alpha,\alpha',\alpha''$-tris(hydroxyphenyl)-1,3,5-trialkylbenzenes. For example, the linkages of the alpha carbons to the phenolic nuclei are ortho, meta and para to the hydroxy group. It has been found, however, that the reaction product is generally comprised of an isomeric mixture of $\alpha,\alpha',\alpha''$-tris(hydroxyphenyl)-1,3,5-trialkylbenzenes wherein the alpha carbons are attached to the phenolic nuclei in positions predominantly ortho or predominantly para to the hydroxy groups or a mixture of more equal proportions of the two isomeric forms, and may be controlled by choice of phenolic reactant. For example, reaction with phenol or meta-substituted phenols produces a reaction product comprised predominantly of the para and ortho isomers of $\alpha,\alpha',\alpha''$-tris(hydroxyphenyl)-1,3,5-trialkylbenzenes. By employing a phenolic reactant having a substituent on the para position to the hydroxy group, a reaction product comprised predominantly of ortho isomer is produced. On the other hand, by utilizing a phenolic compound having an ortho substituent a product comprised predominantly of para isomer is produced. It has been found, however, that employment of a trisubstituted phenolic reactant having complete ortho and para substitution with a trisubstituted benzene reactant results in little or no reaction.

The reaction product comprised of mixtures of the isomers have been found eminently suitable in the production of epoxide resins without the need of expensive purification or isolation procedures. More specifically, the epoxide resins produced by epoxidation of the isomeric reaction mixture have not only been found to possess outstanding chemical and mechanical properties but also, in some instances, exhibit superior chemical stability as compared to the epoxide resins produced from the purified para isomer of $\alpha,\alpha',\alpha''$-tris(hydroxyphenyl)-1,3,5-trialkylbenzene. The production of epoxide resins from the isomeric mixtures of $\alpha,\alpha',\alpha''$-tris(hydroxyphenyl)-1,3,5-trialkylbenzene obviously possesses the inherent advantage of economical operation since it is not necessary to purify the isomeric mixtures in order to produce a resin having outstanding chemical and mechanical properties.

The molar ratio of the phenolic reactant to the benzene reactant may vary over a wide range. While the amount of about 3 mols phenolic reactant per mol benzene reactant is considered minimum, it is preferred to have an excess of phenolic reactant as high as 50:1. In preferred operation, however, molar ratios of from about 8 to 25 mols phenolic reactant per mol of benzene reactant are utilized.

For improved yields the reaction may be promoted by the use of an acidic condensation catalyst. Suitable catalysts include strong mineral acids such as hydrochloric, hydrobromic, hydrofluoric, sulfuric and phosphoric acids; Friedel-Crafts catalysts such as the halides of boron, aluminum and zinc; acid-activated clays, preferably of the silica-alumina bentonite type; and acidic type ion exchange resins. If a mineral acid catalyst is employed, it may be used either as an aqueous solution or as an anhydrous gas. The amount of mineral acid catalyst employed may vary over a wide range with good results being obtained using from about 0.1 to 10 mols per mol of benzene reactant. When an acid-activated clay or an acidic type ion exchange resin is used as catalyst, the amount usually employed is from about 5 to 40 percent by weight based upon the amount of the reaction mixture. The Friedel-Crafts catalysts are utilized in an amount of about at least one mol catalyst per mol phenolic compound charged.

In preferred operation, the catalyst is selected from the strong acid group and is employed as an aqueous, solution or, more preferably, as an anhydrous gas in an amount sufficient to saturate the reaction mixture.

The reaction temperature may vary from about the melting point to about the boiling point of the reaction mixture. Such temperatures usually fall in the range of from about 40° to about 200° C. If a suitable solvent be utilized reaction temperatures as low as about 25° C. may be employed. In preferred operation, reaction temperatures in the range of about 40° to 90° C. are employed.

In order to secure a homogenous reaction mixture and/or employ lower reaction temperature a solvent may be employed provided it is inert under the conditions of reaction, be a solvent for the reactants employed and allow for elevated temperature if desired. Suitable solvents include cyclohexane, halogenated hydrocarbons such as ethylene chloride and methylene chloride and also aromatic solvents which may contain alkyl or halogen substituents such as toluene and chlorobenzene.

Through experimentation, it has been found that reaction time is not critical. Dependent upon the nature of the reactants, type of catalyst, reaction temperatures and solvent employed, reaction times of about 0.1 to 48 hours are employed. In preferred operation, substantial yields have been secured wherein a reaction time of about 0.5 to 25 hours is employed.

The resulting isomeric mixture of $\alpha,\alpha',\alpha''$-tris(hydroxyphenyl)-1,3,5-trialkylbenzenes may be recovered by removing excess phenolic compound by aqueous extraction. The para isomer can be obtained by recrystallization of the crude $\alpha,\alpha',\alpha''$ - tris(hydroxyphenyl)-1,3,5-trialkylbenzenes from a suitable solvent such as toluene. When hydrogen chloride is used as catalyst, an isomeric mixture of $\alpha,\alpha',\alpha''$ - tris(hydroxyphenyl) - 1,3,5-trialkylbenzenes may be recovered by diluting the reaction mixture with a solvent such as chloroform or toluene followed by vacuum distillation of hydrogen chloride, water, unreacted phenolic reactant and solvent. The para isomer can be obtained by recrystallization as described above.

In preferred operation, $\alpha,\alpha',\alpha''$ - tris(hydroxyphenyl)-1,3,5-trialkylbenzenes are produced by a process which comprises intimately admixing a phenolic compound of the formula:

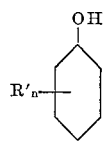

wherein R' is an alkyl radical having 1 to 5 carbon atoms and $n$ is an integer from 0 to 2, and a 1,3,5-trisubstituted benzene compound selected from the group consisting of 1,3,5-trialkenylbenzenes represented by the formula:

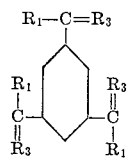

wherein $R_1$ is selected from the group consisting of hydrogen and alkyl radicals having 1 to 2 carbon atoms and $R_3$ is selected from the group consisting of $CH_2$ and $CH—CH_3$ radicals and $\alpha,\alpha',\alpha''$-trihydroxy-1,3,5-trialkylbenzenes which are represented by the formula:

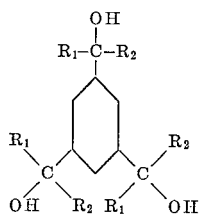

wherein $R_1$ and $R_2$ are the same or different and are selected from the group consisting of hydrogen and alkyl radicals having 1 to 2 carbon atoms, in a mol ratio of from about 8 to 25 mols phenolic compound per mol 1,3,5-trisubstituted benzene compound, at temperature of from about 40° to 90° C., saturating the resulting reaction mixture with anhydrous hydrogen chloride as catalyst and thereafter recovering the resulting $\alpha,\alpha',\alpha''$-tris-(hydroxyphenyl)-1,3,5-trialkylbenzenes from the reaction mixture.

If desired, tri- or hexa-chlorinated derivatives of $\alpha,\alpha',\alpha''$ - tris(hydroxyphenyl - 1,3,5 - trialkylbenzenes may be readily secured employing conventional processes. For example, a typical process comprises dissolving an $\alpha,\alpha',\alpha''$-tris(hydroxyphenyl)-1,3,5-trialkylbenzene in an aqueous alkaline solution such as sodium, potassium or lithium hydroxide having a concentration of about 1 to 4 percent by weight and thereafter adding a suitable chlorinating agent such as sodium or potassium hypochlorite, chlorine gas, etc. Complete reaction and minimum contamination are insured by maintaining the resulting reaction mixture at temperature of about 25° to 50° C. under mild agitation. In order to secure a hexa derivative under the above recited reaction conditions about 6 mols of chlorinating agent as active chlorine per mol $\alpha,\alpha',\alpha''$-tris(hydroxyphenyl)-1,3,5-trialkylbenzene are employed. A mol ratio less than 6 mols of chlorinating agent as active chlorine per mol $a,a',a''$-tris(hydroxyphenyl) - 1,3,5-trialkylbenzene gives rise to a reaction mixture containing a significant amount of the trichloro substituted $\alpha,\alpha',a''$-tris-(hydroxyphenyl)-1,3,5-trialkylbenzene. A mol ratio in excess of 6:1 results in unconsumed chlorinating agent and may, in some instances, produce chlorination other than that of the phenolic moiety. The trichloro derivatives of $\alpha,\alpha',\alpha''$-tris(hydroxyphenyl) - 1,3,5 - trialkylbenzenes may be secured by employing about 3 mols chlorinating agent as active chlorine per mol $\alpha,\alpha',\alpha''$-tris(hydroxyphenyl)-1,3,5-trialkylbenzenes. A mol ratio less than 3:1 is insufficient to produce significant yields of the trichloro derivatives while a mol ratio in excess of 3:1 tends to produce some hexachloro derivatives.

The following examples are given for the purpose of illustration of the preparation of $\alpha,\alpha',\alpha''$-tris(hydroxyphenyl-1,3,5-trialkylbenzenes. In the examples, parts are by weight.

*Example 1*

A reaction vessel was equipped with a mechanical stirrer, gas inlet tube, heated dropping funnel, reflux condenser, thermometer and heating mantle. Into this reaction vessel was charged 1000 parts of phenol followed by heating until a temperature of 65° C. was attained. The molten phenol was then saturated with gaseous hydrogen chloride. A solution of 252 parts of $\alpha,\alpha',\alpha''$-trihydroxy-1,3,5-triisopropylbenzene in 500 parts of phenol was slowly added from the heated dropping funnel over a period of 3 hours. During this addition the reaction mixture was vigorously agitated while the reaction temperature was maintained between 60° and 65° C. Upon complete addition of the $\alpha,\alpha',\alpha''$-trihydroxy-1,3,5-triisopropylbenzene solution, the mixture was agitated for an additional 2 hours. At the end of this period the reaction mixture was allowed to cool and stand at room temperature for a period of 16 hours. Isolation of crude $\alpha,\alpha',\alpha''$-tris(hydroxy)-1,3,5-triisopropylbenzene was effected by addition of 750 parts of chloroform followed by washing with 500 parts of water and then 500 parts of a 5 percent by weight aqueous solution of sodium bicarbonate solution to neutralize any remaining hydrogen chloride. The reaction mixture was then subjected to vacuum distillation at pot temperatures below 150° C. whereupon chloroform, unreacted phenol and water were distilled overhead. Crude $\alpha,\alpha',\alpha''$-tris(hydroxyphenyl)-1,3,5-triisopropylbenzene consisting essentially of its ortho and para isomers was obtained in a yield of 99 percent of theoretical based upon the amount of α,α',α''-trihydroxyl-1,3,5-triisopropylbenzene charged. The para isomer of the crude α,α',α''-tris(hydroxyphenyl)-1,3,5-triisopropylbenzene was isolated by dissolving the crude product in a minimum amount of hot toluene followed by heating with decolorizing carbon and filtration. The resulting filtrate containing the isomers of α,α',α''-tris(hydroxyphenyl)-1,3,5-triisopropylbenzene was cooled to effect precipitation of the para isomer, and the solidified para isomer was separated by filtration. After recrystallization from toluene there was obtained 316 parts of the para isomer having a melting point of 187.5–189.5° C.

*Example 2*

705 parts of phenol were charged to a reaction vessel and melted at a temperature of 52° C. The molten phenol was then saturated with anhydrous gaseous hydrogen chloride and thereafter 458 parts of α,α',α''-trihydroxy-1,3,5-triisopropylbenzene were slowly added over a period of about six hours at a temperature in the range of about 35° to 45° C. Upon completion of this addition, the resulting reaction mixture was allowed to stand at room temperature for 16 hours. At the end of this period unreacted phenol was removed by water extraction, i.e., agitation with water, followed by heating at a temperature 90° to 95° C., followed by decanting of the aqueous phase. This extraction procedure was repeated seven times. The final extract was allowed to cool whereupon crude α,α',α''-tris(hydroxyphenyl)-1,3,5-triisopropylbenzene solidified. After a 1:1 warm water wash the crude α,α',α''-tris(hydroxyphenyl)-1,3,5-triisopropylbenzene was dissolved in 1,2-dichloroethane, heated and allowed to crystallize upon cooling. 114 parts of α,α',α'' - tris(4 - hydroxyphenyl) - 1,3,5 - triisopropylbenzene having a melting point of 189° to 190° C. were recovered.

*Example 3*

To the reaction vessel of Example 1 were charged 153.2 parts of phenol followed by addition of hydrogen chloride over a 40-minute period until saturation of the reaction mixture was effected, the temperature of the reaction mixture being maintained at 53° to 59° C. 25 parts of α,α',α''-trihydroxy-1,3,5-triisopropylbenzene were added to the reaction mixture over a seven minute period while the temperature was maintained at 55° to 63° C. Additional anhydrous hydrogen chloride was bubbled into the mixture for a period of one hour under agitation while the temperature was maintained at 53° to 58° C. The resulting reaction mixture containing crude α,α',α'' - tris(hydroxyphenyl) - 1,3,5 - triisopropylbenzene was then extracted three times with 1000 parts of warm water to remove excess phenol and heated to a temperature of 80° C., whereupon 43.4 parts of α,α',α''-tris(hydroxyphenyl)-1,3,5-triisopropylbenzene having a melting point of 148° to 151° C. was isolated by filtration. Purification was effected by recrystallization from toluene resulting in a product which was primarily the para isomer and which had a melting point of 170° to 181° C.

Carbon-hydrogen analysis of the product indicated 82.5 percent carbon and 7.5 percent hydrogen as compared to the theoretical values of 82.2 percent carbon and 7.6 percent hydrogen.

*Example 4*

Into the reaction vessel of Example 1 were charged 24.6 parts of α,α',α''-trihydroxy-1,3,5-triethylbenzene and 94 parts of phenol. The resulting reaction mixture was then saturated with anhydrous hydrogen chloride at a temperature of about 50° to 60° C. The reaction was exothermic in nature and the reaction temperature immediately rose to 80° C. and was so maintained for a period of 21 hours. The temperature was then increased to 90° C. for an additional six hours. Isolation of crude α,α',α'' - tris(hydroxyphenyl) - 1,3,5 - triethylbenzene was effected by pouring the reaction mixture into 1700 parts of water and heating to temperature of 95° C. with stirring. The resulting solution was allowed to cool and the aqueous extract decanted. This procedure was repeated three times. The crude α,α',α''-tris(hydroxyphenyl)-1,3,5-triethylbenzene was filtered and dried at 50° C. to yield 41.9 parts of product which corresponded to a yield of 81.6 percent of theory.

Chemical analysis showed phenolic hydroxy radical to be present in an amount of 11.4 percent by weight which is in excellent agreement to the theoretical value of 11.6 percent by weight. Infrared spectra showed conjugated ring C=C, hydroxyl group and 1,3,5-substitution all of which confirm the theoretical chemical structure.

The following example illustrates large-scale preparation of α,α',α''-tris(hydroxyphenyl)-1,3,5-triisopropylbenzene.

*Example 5*

5000 parts of phenol were charged into a reaction vessel equipped with a mechanical stirrer, gas inlet tube, heated dropping funnel, reflux condenser, thermometer and heating mantle. Anhydrous hydrogen chloride was bubbled into the molten phenol maintained at temperature of 50° C. over a period of 1 hour. A molten solution consisting of 1260 parts of α,α',α''-trihydroxy-1,3,5-triisopropylbenzene dissolved in 2500 parts of phenol was slowly added to the reaction mixture over a period of 1 hour from the heated dropping funnel. The temperature of the reaction mixture was maintained between 50° and 60° C. After the addition of this solution the reaction mixture was maintained at a temperature of 60° C. for an additional 0.25 to 1 hour under constant agitation and continuous addition of hydrogen chloride. At the end of this period 2400 parts of toluene were added to the reaction mixture followed by vacuum distillation to remove excess phenol, toluene, water and hydrogen chloride. Vacuum distillation was discontinued at pot temperature of 170° to 180° C. at 3 mm. Hg pressure. Upon cooling, 2370 parts of crude α,α',α''-tris(hydroxyphenyl)-1,3,5-triisopropylbenzene crystallized into a brown solid having a melting point of about 150° to 160° C. This yield corresponded to 99.6 percent of theory based upon the α,α',α''-trihydroxy-1,3,5-triisopropylbenzene charged. The crude produce was then dissolved in acetone and solid impurities removed by filtration. 8000 parts of toluene were added to the product-acetone solution followed by strip distillation of the acetone. The reaction mixture was then cooled whereupon 1493 parts of a solid product crystallized out and were recovered by filtration. This product consisted primarily of the para isomer of α,α',α''-tris(hydroxyphenyl)-1,3,5-triisopropylbenzene and had a melting point of 175° C.

*Example 6*

To a reaction vessel was charged 100 parts phenol followed by saturation with anhydrous hydrogen chloride at a temperature of 55° C. 19.8 parts of 1,3,5-triisopropenylbenzene dissolved in 45 parts of phenol were added over a 0.5 hour period. The temperature of the reaction mixture immediately increased to about 65° C. Additional anhydrous hydrogen chloride was added for another 0.5 hour period followed by mixing at 65° C. for a period of 4 hours and then 18 hours at room temperature α,α',α''-tris(hydroxyphenyl)-1,3,5-triisopropylbenzene precipitated out as a solid mass; this was dissolved in chloroform. The resulting solution was then washed with about a 15 percent by weight aqueous sodium carbonate solution followed by two washings with water. 44 parts of α,α',α''-tris(hydroxyphenyl)-1,3,5-triisopropylbenzene were isolated by distilling off the chloroform and excess phenol. This corresponded to a yield of 91.5 percent of theory. Recrystallization from ethylene dichloride yielded the para isomer of α,α',α''-tris(hydroxyphenyl)-1,3,5-triisopropylbenzene as a solid material having a melting point of 183° to 186° C.

*Example 7*

A reaction mixture comprised of 141.2 parts of phenol and 50 parts of an 18 percent by weight aqueous hydrochloric acid solution was prepared and heated to 65° C. under vigorous agitation. 25.2 parts of α,α',α''-trihydroxy-1,3,5-triisopropylbenzene were slowly added with agitation over a period of 40 minutes, the temperature being maintained at 63° to 65° C. The resulting reaction mixture was heated at this temperature for an additional 5.5 hours with agitation after which it was allowed to cool and stand for 19 hours at room temperature. The aqueous phase of the reaction mixture was removed and about 200 parts of chloroform were added followed by successive washing with water until the water washings exhibited a pH of about 7. Chloroform and unreacted phenol were removed by distillation and 53 parts of α,α',α''-tris(hydroxyphenyl)-1,3,5-triisopropylbenzene were obtained. Recrystallization from ethylene dichloride yielded 25 parts of α,α',α''-tris(hydroxyphenyl) - 1,3,5 - triisopropylbenzene which was predominantly the para isomer and had a melting point of 178° to 180° C.

The following example is given for the purpose of illustrating chlorination of α,α',α''-tris(hydroxyphenyl)-1,3,5-triisopropylbenzene.

*Example 8*

10 parts of substantially pure α,α',α''-tris(p-hydroxyphenyl)-1,3,5-triisopropylbenzene were dissolved in 100 parts of a 3 percent by weight aqueous sodium hydroxide solution. To the resulting solution was added dropwise 200 parts of a 5 percent by weight aqueous sodium hypochlorite solution over a period of one hour at a temperature of about 30° C. The reaction mixture was agitated for an additional one hour followed by neutralization effected by the addition of solid sodium bisulfite. Solid α,α',α'' - tris(4 - hydroxy-3,5-dichlorophenyl)-1,3,5-triisopropylbenzene having a melting point of 70° C. separated from the reaction mixture and was recovered by filtration, purified by washing with water and dried. Elemental analysis showed 57.5 percent carbon, 4.5 percent hydrogen, 7.5 percent phenolic hydroxy group and 29.9 percent chlorine which is in excellent agreement with the theoretical values of 57.6 percent carbon, 4.4 percent hydrogen, 7.5 percent phenolic hydroxy group and 30.2 percent chlorine.

*Example 9*

A copper reaction vessel was equipped with a copper mixer, reflux condenser and a thermometer. To this reaction vessel was added about 155 parts of molten phenol and about 19 parts of an aqueous solution of hydrofluoric acid in a concentration of about 38 percent by weight. The resulting reaction mixture was heated to a temperature of 50° C. whereupon 25.2 parts of α,α',α''-trihydroxy-1,3,5-triisopropylbenzene were slowly added followed by heating at a temperature of 62° C. for a period of 5.5 hours under constant agitation. The resulting reaction mixture was then poured over crushed ice and neutralized with solid sodium carbonate. Sodium fluoride was removed from the reaction mixture by filtration and the filtrate was diluted with 2500 parts of water followed by extraction with chloroform. The resulting extract containing crude α,α',α'' - tris(hydroxyphenyl) - 1,3,5-triisopropylbenzene and excess phenol was evaporated to dryness using a film evaporator. 35 parts of crude α,α',α''-tris(hydroxyphenyl)-1,3,5-triisopropylbenzene were isolated by removal of excess phenol by vacuum distillation. This recovery corresponded to a theoretical yield of 73 percent based upon the amount of α,α',α''-trihydroxy-1,3,5-triisopropylbenzene charged. A purified product containing primarily the para isomer of α,α',α''-tris(hydroxyphenyl) - 1,3,5 - triisopropylbenzene and having a melting point of 174° to 181° C. was obtained by crystallization from trichloroethylene.

*Example 10*

972 parts of phenol, 80 parts of toluene and 50 parts of acid-activated bentonite-type clay (Filtrol No. 1) were charged into a reaction vessel equipped with a Dean-Stark trap, a reflux condenser, a thermometer and a mechanical stirrer. The mixture was heated to reflux and water removed from the system until the clay was rendered anhydrous. The mixture was then cooled to 60° C. and 252 parts of α,α',α''-trihydroxy-1,3,5-triisopropylbenzene were added. The reaction mixture was then refluxed for a period of nine hours after which time it was cooled to 80° C. and the clay removed by filtration. The filtrate was distilled to remove toluene and phenol leaving solid product. This product was identified to be a mixture of the ortho and para isomers of α,α',α''-tris(hydroxyphenyl)-1,3,5-triisopropylbenzene by infrared and —OH analysis and represented a yield of 71.2%.

*Example 11*

972 parts of o-cresol are charged into a reaction flask equipped with a mechanical stirrer, gas inlet tube, reflux condenser and thermometer. The o-cresol is heated to 65° C. and is saturated with anhydrous hydrogen chloride. 252 parts of α,α',α''-trihydroxy-1,3,5-triisopropylbenzene are added in 3 equal portions at 1 hour intervals while maintaining the reaction mixture at 65° C. The reaction mixture is maintained at this temperature for an additional 10 hours. The reaction mixture is dissolved in 1500 parts of chloroform and washed free of any trace of acid with water. Chloroform and excess o-cresol are removed from the reaction mixture by distillation and solid α,α',α''-tris(4-hydroxy-3-methylphenyl)-1,3,5-triisopropylbenzene product is obtained upon cooling.

The α,α',α''-tris(hydroxyphenyl)-1,3,5-trialkylbenzenes may be converted to the corresponding epoxide resins by reaction with epichlorohydrin in the presence of an alkali and water.

The usefulness and structure of the resulting epoxide resin may be characterized by employing "epoxide equivalent" values. Epoxide equivalent is defined as the weight in grams of resin containing a 1 gram equivalent of epoxide groups. The epoxide equivalent is determined by reacting a known quantity of the resin with a known quantity of hydrochloric acid and back-titrating the remaining acid to determine its consumption. As a rule of thumb, low average molecular weight resins have an epoxide equivalent in the range of from about 230 up to about 330. Higher average molecular weight resins have correspondingly higher epoxide equivalents since in each such molecule there are long chains between the epoxide end groups. This method of characterizing epoxide resins is more fully discussed by Lee and Neville in "Epoxy Resins," p. 21 (McGraw-Hill 1957).

The molar ratio of the reactants may vary over a wide range depending on the desired physical and chemical properties of the resulting epoxide resin. Generally speaking, the epoxide equivalent of the resin varies inversely with the mol ratio of epichlorohydrin to α,α',α''-tris(hydroxyphenyl)-1,3,5-trialkylbenzene.

Thus, when molar ratios of about 1 up to about 5 mols epichlorohydrin per mol α,α',α''-tris(hydroxyphenyl)-1,3,5-trialkylbenzene are employed, the epoxide equivalent normally falls within the range of over 330 to a value as high as 15,000 whereas molar ratios from about 5 to about 50 mols epichlorohydrin per mol α,α',α''-tris(hydroxyphenyl)-1,3,5-trialkylbenzene yields epoxide resins having epoxide equivalents in the range of from about 230 to about 330.

The reaction of epichlorohydrin with α,α',α''-tris(hydroxyphenyl)-1,3,5-trialkylbenzene is carried out in the presence of an alkali, preferably an alkali metal hydroxide such as sodium hydroxide, potassium hydroxide, and lithium hydroxide. If desired, the alkali may be employed in solid form or in the form of a solution. The alkali is used in an amount sufficient to neutralize by-product hydrochloric acid which is produced during reaction and, further, to transform the chlorohydrin terminal end-groups produced by the initial condensation of $\alpha,\alpha',\alpha''$-tris(hydroxyphenol)-1,3,5 - trialkylbenzene with epichlorohydrin to an epoxide terminal group. It is generally preferred to utilize from about 0.5 to 4 mols alkali per mol $\alpha,\alpha',\alpha''$-tris(hydroxyphenyl)-1,3,5 - trialkylbenzene. In the preparation of high molecular weight resins it is preferred to employ a minimum amount of alkali, as in the order of about 0.5 to 2 mols alkali per mol $\alpha,\alpha',\alpha''$-tris(hydroxyphenyl-1,3,5-trialkylbenzene.

The reaction temperature may vary over a wide range, i.e., from about 40° to 150° C. and preferably from 50° to 110° C. Reaction times from 1 to 24 hours are generally employed.

It has been found that the presence of water has a pronounced influence upon reaction of $\alpha,\alpha',\alpha''$-tris(hydroxyphenyl)-1,3,5 - trialkylbenzenes with epichlorohydrin. More specifically, it is preferred that water be present as a reaction-initiator in amount of at least 0.1% of the total weight of the reactants. The amount of water preferably ranges from at least 0.1 percent to about 5 percent of the total weight of the reactants in the preparation of low epoxide resins. In the preparation of high epoxide equivalent resins, water may be present in the system to a substantially larger degree, as for example, up to about 75 percent by weight of the total weight of the reactants.

Also, if desired, a monohydroxy aliphatic alcohol containing 1 to 4 carbon atoms may be employed in order to increase the rate of reaction. The amount of alcohol which effectively speeds up reaction as well as permitting the use of lower reaction temperatures, such as room temperature, has been found to range from about 20 to 80 weight percent based on the total amount of reactants charged. Illustrative of suitable monohydroxy aliphatic alcohols are methanol, ethanol, n-propanol, isopropanol and butanol.

In preferred operation, a reaction mixture comprised of from about 1 to 50 mols epichlorohydrin per mol $\alpha,\alpha',\alpha''$-tris(hydroxyphenyl)-1,3,5-trialkylbenzene, and 1 to 5 mols alkali per mol $\alpha,\alpha',\alpha''$-tris(hydroxyphenyl)-1,3,5-trialkylbenzene are admixed in the presence of from about 0.1 percent up to 75 percent water based on the total amount of the reactants at a temperature in the range of from about 40° to 150° C. for a period of about 1 to 24 hours in the presence of a monohydric aliphatic alcohol. The resulting epoxide resin may be isolated from the reaction mixture by conventional means. For example, the reaction mixture may be washed with water to remove dissolved salt, filtered and then dried by vacuum distillation or other suitable means to effect removal of excess reactants and water. The resulting epoxide resin may be dissolved in a suitable solvent such as acetone, filtered and redistilled in order to remove the solvent.

The epoxide resins prepared from $\alpha,\alpha',\alpha''$ - tris(hydroxyphenyl)-1,3,5-trialkylbenzene may be cured with conventional curing agents such as primary aliphatic amines as illustrated by diethylene triamine, diethylaminopropylamine and m-phenylene diamine. These cured epoxide resins may then be utilized as adhesives, coatings and electrical potting compounds.

The cured $\alpha,\alpha',\alpha''$-tris(hydroxyphenyl)-1,3,5-trialkylbenzene epoxide resins exhibit outstanding heat distortion temperatures and also possess excellent dimensional stability.

The following examples are given to illustrate the preparation of these new $\alpha,\alpha',\alpha''$-tris(hydroxyphenyl)-1,3,5-trialkylbenzene epoxide resins. In the examples, parts are by weight.

*Example 12*

A reaction mixture comprised of 24 parts of $\alpha,\alpha',\alpha''$-tris(p-hydroxyphenyl) - 1,3,5 - triisopropylbenzene, 41.6 parts of epichlorohydrin and 0.8 part of water was placed in a reaction pot fitted with a mechanical stirrer and reflux condenser, and heated at 95° C. for one-half hour under a nitrogen atmosphere. 6.6 parts of sodium hydroxide were then added in four equal increments over a one hour period while maintaining the reaction mixture at a temperature between 90° to 100° C. The reaction mixture was heated for an additional half hour at a temperature of 100° C. The reaction mixture was filtered and the filtrate vacuum distilled in order to remove excess epichlorohydrin and water. The resulting $\alpha,\alpha',\alpha''$-tris(p-hydroxyphenyl)-1,3,5 - triisopropylbenzene epoxide resin was purified by dissolving in a toluene solution and refiltered. The filtrate was vacuum distilled to remove the toluene, giving 94% yield of epoxide resin of $\alpha,\alpha',\alpha''$ - tris(p-hydroxyphenyl)-1,3,5-triisopropylbenzene having an epoxide equivalent of 289 and being devoid of hydrolyzable chlorine.

*Example 13*

A reaction mixture comprised of 96 parts of $\alpha,\alpha',\alpha''$-tris(p-hydroxyphenyl)-1,3,5 - triisopropylbenzene, 462.5 parts of epichlorohydrin, and 2.96 parts of water was placed in a reaction pot fitted with a mechanical stirrer and a reflux condenser, and heated at a temperature of 95° C. for a period of one hour. 26.4 parts of sodium hydroxide were added in 4 equal increments at fifteen minute intervals while maintaining the reaction mixture at a temperature of 95° C. The reaction mixture was cooled to room temperature, water washed and filtered. The filtrate was vacuum distilled to remove the excess epichlorohydrin and water. The resulting $\alpha,\alpha',\alpha''$-tris(p-hydroxyphenyl)-1,3,5-triisopropylbenzene epoxide resin was dissolved in toluene and filtered in order to effect purification. This filtrate was vacuum distilled to remove the toluene yielding 127.5 parts of epoxide resin having an epoxide equivalent of 253 and no hydrolyzable chlorine content.

*Example 14*

A reaction mixture comprised of 96 parts of $\alpha,\alpha',\alpha''$-tris(p-hydroxyphenyl)-1,3,5 - triisopropylbenzene, 647.5 parts of epichlorohydrin, and 2.9 parts of $H_2O$ was placed in a reaction pot fitted with a mechanical stirrer and reflux condenser and heated at a temperature of 95° C. for a 1 hour period under nitrogen atmosphere. 26.4 parts of sodium hydroxide were added in 4 equal increments at 15-minute intervals while maintaining the reaction mixture at a temperature of 95° C. The reaction mixture was cooled to room temperature and filtered. The filtrate was then vacuum distilled to remove water and epichlorohydrin. The resulting $\alpha,\alpha',\alpha''$-tris(p-hydroxyphenyl)-1,3,5-triisopropylbenzene epoxide resin was dissolved in toluene and filtered to effect purification. The filtrate was vacuum distilled to remove the toluene, yielding 125.7 parts of $\alpha,\alpha',\alpha''$-tris(p-hydroxyphenyl)-1,3,5 - triisopropylbenzene epoxide resin having an epoxide equivalent of 267 and a hydrolyzable chlorine content of 0.16%.

*Example 15*

A reaction mixture comprised of 12 parts of $\alpha,\alpha',\alpha''$-tris(p-hydroxyphenyl)-1,3,5-triisopropylbenzene and 2.3 parts of epichlorohydrin was heated to a temperature of 60° C. and 21.4 parts of 50% ethanol were added to effect homogeneous solution. The reaction mixture was then heated at a temperature of 60° C. for a period of one-half hour, followed by the addition of 1.1 parts of sodium hydroxide over a one-half hour period while maintaining the temperature of the reaction mixture at 60° C. After the addition of the sodium hydroxide, heating was continued for a period of 15 minutes. The reaction mixture was cooled to room temperature and formed a two layer system. A light brown solid was recovered from the lower layer after evaporation of excess alcohol and epichlorohydrin. This solid α,α',α''-tris(p - hydroxyphenyl)-1,3,5-triisopropylbenzene epoxide resin was dissolved in 18 parts of acetone. The resulting solution was filtered and the acetone removed by vacuum distillation. 12.3 parts of α,α',α''-tris(p-hydroxyphenyl)-1,3,5-triisopropylbenzene epoxy resin having an epoxide equivalent of 4,280 and a hydrolyzable chlorine content of 0.56% were obtained.

*Example 16*

A reaction mixture comprised of 120 parts of an isomeric mixture of α,α',α'' - tris(hydroxyphenyl) - 1,3,5-triisopropylbenzenes having a melting point of 148–151° C., 578.1 parts of epichlorohydrin and 3.7 parts of water was prepared and introduced into a reaction pot fitted with a mechanical stirrer and reflux condenser, and heated at 95° C. for one hour under a nitrogen atmosphere. 33 parts of sodium hydroxide were added in four equal increments over a one hour period while the reaction mixture was maintained at a temperature of about 90 to 100° C. The reaction mixture containing crude α,α',α''-tris(hydroxyphenyl) - 1,3,5 - triisopropylbenzene epoxide resin was filtered and the filtrate vacuum distilled to remove epichlorohydrin and water. The resulting product was purified by dissolving in toluene and filtering. The filtrate was vacuum distilled yielding 155 parts of α,α',α''-tris(hydroxyphenyl) - 1,3,5 - triisopropylbenzene epoxy resin having an epoxide equivalent of 258 and a hydrolyzable chlorine content of 0.15%.

*Example 17*

A reaction mixture comprised of 87.6 parts of α,α',α''-tris(hydroxyphenyl)-1,3,5-triethylbenzene, 462.5 parts of epichlorohydrin and 2.96 parts of water is placed in a reaction pot fitted with a mechanical stirrer and a reflux condenser and heated at a temperature of 95° C. for a one hour period under nitrogen atmosphere. 26.4 parts of sodium hydroxide are then added in four equal increments at 15 minute intervals while maintaining the reaction mixture at a temperature of 95° C. The reaction mixture containing crude α,α',α''-tris(hydroxyphenyl)-1,3,5-triethylbenzene epoxy resin is cooled to room temperature and filtered. The filtrate is then vacuum distilled to remove the water and epichlorohydrin. The resulting α,α',α'' - tris(hydroxyphenyl)-1,3,5-triethylbenzene epoxy resin is dissolved in toluene and, once again, filtered. The filtrate is vacuum distilled to remove toluene, yielding α,α',α''-tris(hydroxyphenyl)-1,3,5-triethylbenzene epoxide resin having an epoxide equivalent of about 230.

*Example 18*

A reaction mixture comprised of 136.8 parts of α,α',α''-tris(4'-hydroxy-3',5'-dichlorophenyl)-1,3,5 - triisopropylbenzene, 462.5 parts of epichlorohydrin and 2.96 parts of water is placed in a reaction pot fitted with a mechanical

*Example 19* stirrer and a reflux condenser, and heated at a temperature of 95° C. for a one hour period under a nitrogen atmosphere. 26.4 parts of sodium hydroxide are added in four equal increments at 15 minute intervals while maintaining the reaction mixture at a temperature of 95° C. The reaction mixture is cooled to room temperature and filtered. The filtrate is vacuum distilled to remove the water and epichlorohydrin. The resulting crude α,α',α'' - tris(4' - hydroxy - 3', 5' - dichlorophenyl)-1,3,5-triisopropylbenzene epoxy resin is dissolved in toluene and filtered. The filtrate is vacuum distilled to remove the toluene, yielding an α,α',α'' - tris(4' - hydroxy-3',5'-dichlorophenyl) - 1,3,5 - triisopropylbenzene epoxy resin having an epoxide equivalent of about 360.

A reaction mixture comprised of 480 parts of α,α',α''-tris(p - hydroxyphenyl) - 1,3,5 - triisopropylbenzene, 348 grams of isopropanol and 230 parts of epichlorohydrin was heated at a temperature of 70° C. for one hour period under a nitrogen atmosphere. 440 parts sodium hydroxide in the form of an aqueous solution were added followed by heating a reflux temperature for a two hour period. The reaction mixture was cooled to room temperature and the water-alcohol layer decanted. The crude α,α',α''-tris(p-hydroxyphenyl)-1,3,5 - triisopropylbenzene epoxide resin was then washed with water and then redissolved in acetone. The solution was filtered and the filtrate vacuum distilled to remove the acetone. The resulting α,α',α'' - tris(p - hydroxyphenyl) - 1,3,5-triisopropylbenzene epoxide resin had an epoxide equivalent of 870.

*Example 20*

Bars of cured resin were prepared using the epoxide resin of Example 14 which had been prepared from the para isomer of α,α',α'' - tris(hydroxyphenyl)-1,3,5-triisopropylbenzene and the epoxide resin of Example 16 which had been prepared from an isomeric mixture of α,α',α''-tris(hydroxyphenyl)-1,3,5-triisopropylbenzene. The curing agent used was m-phenylene diamine which was added in equivalent amounts of 10.1 parts per 100 parts of the epoxide resin of Example 14, and 10.5 parts per 100 parts of the epoxide resin of Example 16. The cured resin bars were prepared by mixing the m-phenylene diamine curing agent with each of the resins at a temperature of about 70° C., pouring the resulting reaction mixture into molds, placing the molds in a vacuum oven at a temperature of 70° C. for one-half hour with the pressure reduced to the point where air bubbles did not cause resin to overflow from the molds, and thereafter, finally placing the molds in an oven at a temperature of 150° C. at atmospheric pressure for a period of 6 hours. The properties of the cured α,α',α''-tris(hydroxyphenyl)-1,3,5-trialkyl benzene epoxide resins are contained in Table I, set forth below.

TABLE I

| Property | Epoxide Resin of Example 14 | Epoxide Resin of Example 16 | Test Method |
| --- | --- | --- | --- |
| Epoxide Equivalent, before curing | 267 | 258 | (Supra) |
| Tensile Strength, p.s.i. | 10,222 | 8,741 | ASTM 638 |
| Ultimate Elongation, percent | 6.1 | 3.9 | ASTM 638 |
| Modulus, p.s.i. | 225,519 | 223,299 | ASTM 638 |
| Flexural Strength, p.s.i. | 16,033 | 19,968 | ASTM D7 |
| Flexural Modulus, p.s.i. | 413,000 | 526,316 | ASTM D790 |
| Compression Yield, p.s.i. | 17,758 | 19,000 | ASTM D695 |
| Compression Strength, p.s.i. | 23,493 | 27,700 | ASTM D695 |
| Izod Impact, Inch Pounds | 1.38 | 0.37 | ASTM 256 |
| Rockwell Hardness, M-Scale | 125 | 112 | ASTM D785 |
| Heat Distortion Temperature, 264 p.s.i., ° C. | 156 | 145 | ASTM D648 |

Example 21

Adhesives were formulated from epoxide resins of Examples 14 and 16 by mixing 100 parts by weight of each of the resins with 40 parts by weight of aluminum powder and an equivalent amount of m-phenylene diamine (10.1 parts and 10.5 parts, respectively). The adhesives were then sandwiched between a ½ inch x 1 inch overlap of sand blasted 1 inch x 4½ inches x ⅛ inch aluminum strips and the assemblies cured for 6 hours at 150° C. under contact pressure. The results are summarized in Table II, set forth below.

TABLE II

| Epoxide Resin | Bond Thickness, mils | Tensile Shear, p.s.i. | Test Method |
|---|---|---|---|
| Example 14 | 10 to 12 | 1,600 to 1,800 | ASTM D1002 |
| Example 16 | 10 to 12 | 1,400 | ASTM D1002 |

This invention may be embodied in other forms or carried out in other ways without departing from the spirit or essential characteristics thereof. The present embodiment is, therefore, to be considered in all respects as illustrative and not restrictive, the scope of the invention being indicated by the appended claims.

We claim:

1. $\alpha,\alpha',\alpha''$-tris(hydroxyphenyl) - 1,3,5-trialkylbenzenes of the formula:

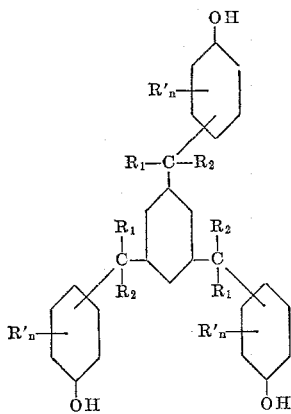

wherein $R_1$ and $R_2$ are selected from the group consisting of hydrogen and alkyl radicals having 1 to 2 carbon atoms, $R'$ is selected from the group consisting of chlorine and alkyl radicals having 1 to 5 carbon atoms and $n$ is an integer from 0 to 2.

2. $\alpha,\alpha',\alpha''$ - tris(4 - hydroxyphenyl) - 1,3,5-triisopropylbenzene.

3. $\alpha,\alpha',\alpha''$-tris(hydroxyphenyl)-1,3,5-triethylbenzene.

4. $\alpha,\alpha',\alpha''$ - tris(4 - hydroxy - 3,5-dichlorophenyl)-1,3,5-triisopropylbenzene.

5. A process for the preparation of $\alpha,\alpha',\alpha''$-tris(hydroxyphenyl)-1,3,5-trialkylbenzenes which comprises admixing a 1,3,5-trisubstituted benzene compound selected from the group consisting of $\alpha,\alpha',\alpha''$-trihydroxy-1,3,5-trialkylbenzenes represented by the formula:

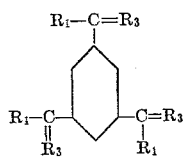

wherein $R_1$ and $R_2$ are selected from the group consisting of hydrogen and alkyl radicals having from 1 to 2 carbon atoms and 1,3,5-trialkenylbenzenes represented by the formula:

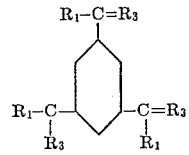

wherein $R_1$ is selected from the group consisting of hydrogen and alkyl radicals having 1 to 2 carbon atoms and $R_3$ is selected from the group consisting of $CH_2$ and $CH-CH_3$ radicals with a phenolic compound of the formula:

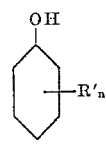

wherein $R'$ is an alkyl radical having from 1 to 5 carbon atoms and $n$ is an integer from 0 to 2, in mol ratio of at least about 3 mols phenolic compound per mol of the 1,3,5-trisubstituted benzene compound, in the presence of an acidic condensation catalyst and thereafter recovering the resulting $\alpha,\alpha',\alpha''$-tris(hydroxyphenyl)-1,3,5-trialkylbenzenes from the reaction mixture.

6. A process in accordance with claim 5 wherein the molar ratio of the reactants is from about 8 mols to 25 mols phenolic compound per mol 1,3,5-trisubstituted benzene compound.

7. A process in accordance with claim 5 wherein the acidic condensation catalyst is anhydrous hydrogen chloride.

8. A process in accordance with claim 5 wherein the reaction temperature is from about 40° to 90° C.

9. A process in accordance with claim 5 wherein an inert organic solvent for the reactants is employed.

10. A process in accordance with claim 9 wherein the reaction temperature is from about 25° to 200° C.

11. A process in accordance with claim 5 wherein the 1,3,5-trisubstituted benzene compound is $\alpha,\alpha',\alpha''$- trihydroxy-1,3,5-triisopropylbenzene and the phenolic reactant is phenol.

12. A process in accordance with claim 5 wherein the 1,3,5-trisubstituted benzene reactant is $\alpha,\alpha',\alpha''$-trihydroxy-1,3,5-triethylbenzene and the phenolic reactant is phenol.

13. A process in accordance with claim 5 wherein the 1,3,5-trisubstituted benzene compound is $\alpha,\alpha',\alpha''$-trihydroxy-1,3,5-triisopropylbenzene and the phenolic reactant is 3,5-dichlorophenol.

14. $\alpha,\alpha',\alpha''$-tris(hydroxyphenyl) - 1,3,5-trialkylbenzenes of the formula:

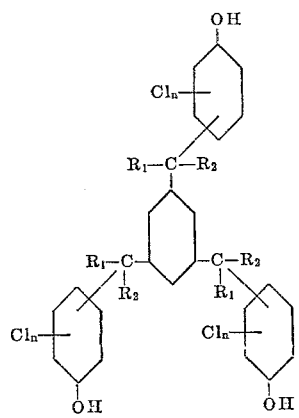

wherein $R_1$ and $R_2$ are members selected from the group consisting of hydrogen and alkyl having 1 to 2 carbon atoms and $n$ is an integer of 0 to 2.

15. A compound as claimed in claim 14, wherein $R_1$ and $R_2$ are methyl groups.

16. An epoxide resin comprising a reaction product of epichlorohydrin and at least one trisphenol of the formula:

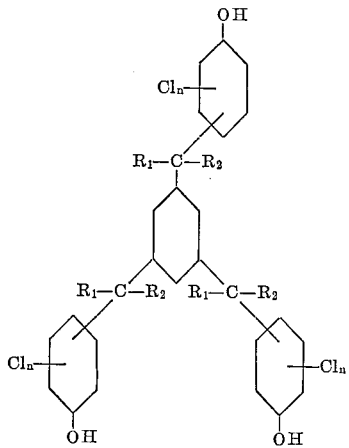

wherein $R_1$ and $R_2$ are members selected from the group consisting of hydrogen and alkyl having 1 to 2 carbon atoms and $n$ is an integer of 0 to 2.

17. An epoxide resin as claimed in claim 16, wherein $R_1$ and $R_2$ are methyl groups.

18. An epoxide resin as claimed in claim 16, wherein the trisphenol is an isomeric mixture of $\alpha,\alpha',\alpha''$-tris(hydroxyphenyl)-1,3,5-triisopropylbenzenes.

19. An epoxide resin as claimed in claim 16, wherein the trisphenol is $\alpha,\alpha',\alpha''$-tris(4-hydroxyphenyl)-1,3,5-triisopropylbenzene.

20. An epoxide resin as claimed in claim 16, wherein the trisphenol is $\alpha,\alpha',\alpha''$ - tris(4 - hydroxy - 3,5 - dichlorophenyl)-1,3,5-triisopropylbenzene.

References Cited by the Examiner
UNITED STATES PATENTS

| | | | |
|---|---|---|---|
| 3,001,972 | 9/1961 | Christenson | 260—619 |
| 3,026,264 | 3/1962 | Rocklin | 260—619 |
| 3,092,610 | 6/1963 | Schwarzer | 260—47 |

WILLIAM H. SHORT, *Primary Examiner.*

J. C. MARTIN, M. GOLDSTEIN, *Assistant Examiners.*